United States Patent
Li et al.

(10) Patent No.: US 9,686,066 B2
(45) Date of Patent: Jun. 20, 2017

(54) METHOD AND TERMINAL FOR DETERMINING CHANNEL STATE INFORMATION

(71) Applicant: ZTE CORPORATION, Shenzhen (CN)

(72) Inventors: Yu Ngok Li, Shenzhen (CN); Jun Xu, Shenzhen (CN); Senbao Guo, Shenzhen (CN); Junfeng Zhang, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 88 days.

(21) Appl. No.: 14/437,946

(22) PCT Filed: Oct. 24, 2013

(86) PCT No.: PCT/CN2013/085898
§ 371 (c)(1),
(2) Date: Apr. 23, 2015

(87) PCT Pub. No.: WO2014/063647
PCT Pub. Date: May 1, 2014

(65) Prior Publication Data
US 2015/0295694 A1      Oct. 15, 2015

(30) Foreign Application Priority Data
Oct. 24, 2012  (CN) .......................... 2012 1 0410504

(51) Int. Cl.
*H04L 5/00*      (2006.01)
*H04L 1/00*      (2006.01)
*H04B 7/0452*   (2017.01)
*H04W 72/04*    (2009.01)

(52) U.S. Cl.
CPC ......... *H04L 5/0057* (2013.01); *H04B 7/0452* (2013.01); *H04L 1/0026* (2013.01);
(Continued)

(58) Field of Classification Search
CPC ...... H04L 1/0026; H04L 43/02–43/028; H04L 43/06–43/067; H04B 7/0636–7/0663
See application file for complete search history.

(56) References Cited

U.S. PATENT DOCUMENTS

| | | | |
|---|---|---|---|
| 2012/0127869 A1 | 5/2012 | Yin et al. | |
| 2013/0258965 A1* | 10/2013 | Geirhofer | H04L 1/0026 370/329 |
| 2014/0010126 A1* | 1/2014 | Sayana | H04B 7/0626 370/280 |

FOREIGN PATENT DOCUMENTS

| | | |
|---|---|---|
| CN | 102271401 A | 12/2011 |
| CN | 102594528 A | 7/2012 |

(Continued)

OTHER PUBLICATIONS

3GPP TSG RAN WG1 Meeting #71, New Orleans, USA, Nov. 12-16, 2012, Draft Report of 3GPP TSG RAN WG1 #70bis v0.1.0, 13 pages.

(Continued)

*Primary Examiner* — Pao Sinkantarakorn
(74) *Attorney, Agent, or Firm* — Thomas Horstemeyer, LLP (57) ABSTRACT

A method and terminal for determining channel state information are disclosed. The method includes: a terminal receiving an aperiodic channel state information CSI request, determining a parameter X according to a capability of the terminal processing a CSI process and/or the number of CSI processes y configured currently, and updating up to X aperiodic CSI according to the parameter X; wherein the parameter X is: a total number of CSI processes or reports required to be updated by the terminal at the same moment in one or more aperiodic CSI requests.

18 Claims, 2 Drawing Sheets

(52) U.S. Cl.
CPC .......... *H04L 1/0027* (2013.01); *H04L 5/0055* (2013.01); *H04W 72/042* (2013.01)

(56) References Cited

FOREIGN PATENT DOCUMENTS

| | | |
|---|---|---|
| CN | 102638325 A | 8/2012 |
| WO | 2013192482 A1 | 12/2013 |

OTHER PUBLICATIONS

3GPP TSG RAN WG1 Meeting #72, St Julian's, Malta, Jan. 28-Feb. 1, 2013, Correction to Aperiodic CSI reporting with one configured CSI process, 7.2.2, 4 pages.
3GPP TSG RAN WG1 Meeting #71, New Orleans, USA, Nov. 12-16, 2012, Final Report of 3GPP TSG RAN WG1 #70 bis v1.0.0, 94 pages.
3GPP TSG RAN WG1 Meeting #70bis, San Diego, USA, Oct. 8-12, 2012, UE processing aspects of CSI feedback, 5 pages.
"Aperiodic CSI feedback modes for CoMP". 3GPP TSG RAN WG1 Meeting #70, San Diego, USA, Oct. 8-12, 2012. R1-124198.
"UE processing requirement for supporting DL CoMP". 3GPP TSG RAN WG1 Meeting #70bis, San Diego, USA, Oct. 8-12, 2012. R1-124278.
"UE processing related aspects on CSI Feedback". 3GPP TSG RAN WG1 Meeting #70bis, San Diego, USA, Oct. 8-12, 2012. R1-124195.
International Search Report for PCT/CN2013/085898 mailed on Jan. 5, 2014.

\* cited by examiner

METHOD AND TERMINAL FOR DETERMINING CHANNEL STATE INFORMATION

CROSS-REFERENCE TO RELATED APPLICATIONS

This application is the 35 U.S.C. §371 national stage of PCT Application No. PCT/CN2013/085898, filed Oct. 24, 2013, which is herein incorporated by reference in its entirety and which also claims priority to, and the benefit of, Chinese Patent Application No. 201210410504.1, filed Oct. 24, 2012, which is herein incorporated by reference in its entirety.

TECHNICAL FIELD

The present document relates to the field of mobile wireless communication, and particularly, to a terminal and method for determining channel state information with regard to a specific transmission mode in the wireless communication system.

BACKGROUND OF THE RELATED ART

In the wireless communication technology, when a base station side (e.g. an evolved Node B (eNB)) sends data through multiple antennas, a data transmission rate can be improved by means of spatial multiplexing, that is, a transmitting terminal transmits different data at different antenna locations through the same time-frequency resources, and a receiving terminal (e.g. a User Equipment (UE)) also receiving the data through multiple antennas. Resources of all the antennas are allocated to the same user in a case of single user, and the user solely occupies physical resources assigned to be allocated by the base station side within one transmission interval, and such transmission mode is called Single User Multiple-Input Multiple-Out-put (SU-MIMO); space resources of different antennas are allocated to different users in a case of multiple users, and one user and at least one of other users share the physical resources allocated by the base station side within one transmission interval, and a sharing mode can be a spatial division multiple access mode or a spatial division multiplexing mode, and such transmission mode is called Multiple User Multiple-Input Multiple-Out-put (MU-MIMO), wherein the physical resources allocated by the base station side refer to time-frequency resources. If the transmission system needs to support the SU-MIMO and the MU-MIMO simultaneously, the eNB is required to provide data in these two modes for the UE. Either in the SU-MIMO mode or MU-MIMO mode, the UE is required to acquire a Rank used when the eNB transmits MIMO data with regard to the UE. In the SU-MIMO mode, the resources of all the antennas are allocated to the same user, and the number of layers used for transmitting the MIMO data is equal to the Rank used when the eNB transmits the MIMO data; in the MU-MIMO mode, the number of layers used for transmission corresponding to one user is less than the total number of layers for the eNB transmitting the MIMO data, and if it is to perform handover between the SU-MIMO mode and the MU-MIMO, the eNB is required to inform the UE of different control data in different transmission modes.

In a Long Term Evolution (LTE) system, control signalings required to be transmitted in uplink include the Acknowledgement/Negative Acknowledgement (ACK/NACK) message, and three forms reflecting downlink physical Channel State Information (CSI): Channel quality indication (CQI), Pre-coding Matrix Indicator (PMI) and Rank Indicator (RI).

The CQI is an index used for measuring the downlink channel quality. The CQI is represented by integer values 0~15 in the protocols 36-213, which respectively stands for different CQI levels, and different CQIs correspond to respective Modulation and Coding Scheme (MCS), referring to Table 1. The selection of CQI levels should follow the following criterion:

a selected CQI level should make a block error ratio of a Physical Downlink Shared Channel (PDSCH) transmission block corresponding to the CQI not exceed 0.1 in a corresponding MCS.

Based on a non-restricted detection interval in a frequency domain and a time domain, the UE will obtain the highest CQI value corresponding to each maximum CQI value reported in an uplink subframe n, and the range of serial number of the CQI is 1-15 and meets the following condition, and if a CQI serial number 1 does not meet the condition, the CQI serial number is 0: a error ratio is not exceeding 0.1 when a single PDSCH transmission block is received, and the PDSCH transmission block contains joint information: a modulation mode and the size of transmission block, and it corresponds to one CQI serial number and a group of downlink physical resource blocks occupied, namely CQI reference resources. The highest CQI value is the maximum CQI value when it is guaranteed that the Block Error Ratio (BLER) is not greater than 0.1, which is beneficial to control resource allocation. Generally speaking, the less the CQI value is, the more occupied resources are, and the better BLER performance is.

For the joint information containing the size of transmission block and the modulation mode corresponding to one CQI serial number, the joint information transmitted by the PDSCH in the CQI reference resources can be notified through signaling according to the size of related transmission block, moreover, the modulation scheme is represented by the CQI serial number and applied in the joint information containing the size of transmission block and the modulation scheme in the reference resources, and an effective channel coding rate generated by the modulation scheme is the most probably approximate effective channel coding rate that can be represented by the CQI serial number. When there is more than one of such joint information and all the joint information can generate a similar approximate effective channel coding rate represented by the CQI serial number, the joint information containing the smallest size of transmission block is adopted.

Each CQI serial number corresponds to one modulation mode and the size of transmission block, and a corresponding relation between the size of transmission block and the NPRB can be represented by a table. The coding rate can be computed according to the size of transmission block and the size of NPRB.

In the LTE system, the ACK/NACK message is transmitted in formats 1/1a/1b (PUCCH format1/1a1/b) in a Physical Uplink Control Channel (PUCCH), and if a terminal (i.e., the User Equipment (UE)) needs to send uplink data, it performs transmission in a Physical Uplink Shared Channel (PUSCH), a feedback of the CQI/PMI and RI can be a periodic feedback or an aperiodic feedback, and the specific feedbacks are as shown in Table 1.

TABLE 1

Uplink physical channels corresponding to periodic
feedback or aperiodic feedback

| Scheduling mode | Periodic CQI report channel | Aperiodic CQI report channel |
|---|---|---|
| Frequency non-selectivity | PUCCH | |
| Frequency selectivity | PUCCH | PUSCH |

With regard to the CQI/PMI and RI fed back periodically, if the UE does not need to send the uplink data, the CQI/PMI and RI fed back periodically are transmitted in formats 2/2a/2b (PUCCH format2/2a/2b) in the PUCCH, and if the UE needs to send the uplink data, the CQI/PMI and RI are transmitted in the PUSCH; and with regard to the CQI/PMI and RI fed back aperiodically, they are only transmitted in the PUSCH.

The Long-Term Evolution (LTE) Release 8 standard defines the following three kinds of downlink physical control channels: a Physical downlink Control Format Indicator Channel (PCFICH), a Physical Hybrid Automatic Retransmission Request Indicator Channel (PHICH) and a Physical Downlink Control Channel (PDCCH). The PDCCH is used for bearing Downlink Control Information (DCI), including uplink scheduling information and downlink scheduling information, and uplink power control information. The DCI formats are divided into the following kinds: a DCI format 0, a DCI format 1, a DCI format 1A, a DCI format 1B, a DCI format 1C, a DCI format 1D, a DCI format 2, a DCI format 2A, a DCI format 3 and a DCI format 3A and so on; wherein a transmission mode 5 supporting the MU-MIMO uses downlink control information of the DCI format 1D, and a downlink power offset field $\delta_{power-offset}$ in the DCI format 1D is used for indicating information of halved power (i.e., −10 log 10 (2)) with regard to one user in the MU-MIMO mode, and since the MU-MIMO transmission mode 5 only supports the MU-MIMO transmission of two users, through the downlink power offset field, the MU-MIMO transmission mode 5 can support a dynamic handover between the SU-MIMO mode and the MU-MIMO mode, but the DCI format only supports transmission of one stream with regard to one UE either in the SU-MIMO mode or the MU-MIMO mode, even though the LTE Release 8 supports single user transmission of two streams at most in a transmission mode 4, since the handover between the transmission modes can only be semi-static, the dynamic handover between the single user multistream transmission and the multiple user transmission cannot be implemented in the LTE Release 8.

In the LTE Release 9, in order to enhance the downlink multi-antenna transmission, a dual-stream beamforming transmission mode is introduced and defined as a transmission mode 8, and a DCI format 2B is added in the downlink control information to support the transmission mode, and there is an identity bit of scrambling identity (SCID) in the DCI format 2B to support two different scrambling sequences, and the eNB can allocate these two scrambling sequences to different users, and multiple users are multiplexed in the same resource. Moreover, when there is only one transmission block enabled, a New Data Indicator (NDI) bit corresponding to a disabled transmission block is also used for indicating an antenna port during the single layer transmission.

In addition, in the LTE Release 10, in order to further enhance the downlink multi-antenna transmission, a new closed-loop spatial multiplexing transmission mode is added and defined as a transmission mode 9, and a DCI format 2C is added in the downlink control information to support the transmission mode, and the transmission mode can support both the SU-MIMO and the MU-MIMO, and it also can support the dynamic handover between the SU-MIMO and the MU-MIMO, moreover, the transmission mode also supports 8-antenna transmission. A demodulation pilot frequency (i.e., a UE Specific Reference Signal (URS)) has been determined to serve as a pilot frequency used for demodulation in this new transmission mode, and the UE is required to acquire a location of the pilot frequency, and then it can perform channel estimation and interference estimation on the pilot frequency.

In the release R10, the UE is semi-statically set to receive the PDSCH data transmission according to an indication of a PDCCH of UE-Specific search space based on one of the following transmission modes through a high layer signaling:

Transmission mode 1: Single-antenna port; port 0
Transmission mode 2: Transmit diversity
Transmission mode 3: Open-loop spatial multiplexing
Transmission mode 4: Closed-loop spatial multiplexing
Transmission mode 5: Multi-user MIMO
Transmission mode 6: Closed-loop Rank=1 precoding
Transmission mode 7: Single-antenna port; port 5
Transmission mode 8: dual-stream transmission, namely dual-stream beamforming
Transmission mode 9: up to 8 layer transmission In the release R10, the transmission mode 9 and a measurement reference signal Channel-State Information-Reference Symbol (CSI-RS) are newly added, and the transmission mode 9 is to perform channel measurement based on the CSI-RS or Cell-specific reference signals (CRS), thus the CQI is computed and obtained. The other transmission modes are to perform channel measurement based on the CRS, thus the CQI is computed.

In the frequency domain, the CSI reference resources are defined with a group of downlink physical resource blocks, and the downlink physical resource blocks correspond to frequency bands corresponding to source CQI values; in the time domain, the CSI reference resources are defined with one downlink subframe; and in the transmission layer domain, the CSI reference resources are defined with any RI and PMI, wherein the CQI is on the condition of the PMI/RI.

In the R10, with regard to the transmission mode 9, since a new concept of "dual codebook" or "dual PMI" is introduced, and it is required to feed back two PMIs; with regard to 8 antenna, a first PMI indicates channel state information of a broadband, a second PMI indicates channel state information of a subband, and only when the two PMIs are obtained, can complete precoding matrix information be obtained, wherein the subband includes a case of the broadband; with regard to 2 antennas and 4 antennas, the first PMI indicates a unit matrix, and the second PMI is equivalent to a PMI of the original R8 protocol.

The Long Term Evolution (LTE) system continues to prepare for studying the R11 technology after going through the releases R8/9/10. At present, part of R8 products start to be commercial gradually, and the R9 and R10 need further product planning.

After going through the R8/9 stages, many new characteristics are added in the R10 based on the R8/9, such as pilot frequency characteristics including a Demodulation Reference Signal (DMRS) and a Channel State Information Reference Signal (CSI-RS) and so on, transmission including 8-antenna transmission being supported and feedback characteristics and so on, especially the enhanced Inter-Cell Interference Cancelling (eICIC) technology further considers the inter-cell interference avoidance technology based on the consideration of the R8/9 Inter-Cell Interference Cancelling (ICIC). The technologies solving the inter-cell interference problems mainly consider the cell interference avoidance in a homogeneous network at the initial stage of R10, wherein the mainstream eICIC technology and Coordinated Multi-point (CoMP) technology are considered. The CoMP is multiple nodes coordinating to send data to one or more UEs in the same time-frequency resources or different time-frequency resources as its name implies. With the CoMP technology, it can reduce the inter-cell interference, improve the cell-edge throughput rate, and expand the cell coverage. However, since more scenarios introduced in a heterogeneous network is considered at the later period of discussion, due to the complexity of the CoMP technology and a time limitation of the R10 discussion, it is finally decided that additional CoMP standardization contents are not introduced at the stage of R10, but the CSI-RS can be designed in consideration of part of CoMP demands, hence the CoMP technology is not further discussed after the 60bis conference.

Configuration information of the R10 CSI-RS mainly includes a non-zero power CSI-RS configuration signaling and a zero power CSI-RS configuration signaling. The non-zero power CSI-RS configuration mainly considers to notify the terminal side of a time-frequency resource location of each non-zero power CSI-RS in one subframe by means of table indexes, as shown in Table 2 and Table 3, and notify the terminal side of antenna ports already corresponding to the number of time-frequency resources occupied by the non-zero power CSI-RS through the number of antenna ports configured, and notify the terminal side of a subframe receiving the CSI-RS through subframe offset and periodic indexes, as shown in Table 4.

TABLE 2

Resource mapping configured by CSI-RS at normal cyclic prefix subframes

| | CSI reference signal Configuration | Number of CSI reference signals configured | | | | | |
|---|---|---|---|---|---|---|---|
| | | 1 or 2 | | 4 | | 8 | |
| | | (k',l') | $n_s$ mod 2 | (k',l') | $n_s$ mod 2 | (k',l') | $n_s$ mod 2 |
| Frame structure type 1 and 2 | 0 | (9,5) | 0 | (9,5) | 0 | (9,5) | 0 |
| | 1 | (11,2) | 1 | (11,2) | 1 | (11,2) | 1 |
| | 2 | (9,2) | 1 | (9,2) | 1 | (9,2) | 1 |
| | 3 | (7,2) | 1 | (7,2) | 1 | (7,2) | 1 |
| | 4 | (9,5) | 1 | (9,5) | 1 | (9,5) | 1 |
| | 5 | (8,5) | 0 | (8,5) | 0 | | |
| | 6 | (10,2) | 1 | (10,2) | 1 | | |
| | 7 | (8,2) | 1 | (8,2) | 1 | | |
| | 8 | (6,2) | 1 | (6,2) | 1 | | |
| | 9 | (8,5) | 1 | (8,5) | 1 | | |
| | 10 | (3,5) | 0 | | | | |
| | 11 | (2,5) | 0 | | | | |
| | 12 | (5,2) | 1 | | | | |
| | 13 | (4,2) | 1 | | | | |
| | 14 | (3,2) | 1 | | | | |
| | 15 | (2,2) | 1 | | | | |
| | 16 | (1,2) | 1 | | | | |
| | 17 | (0,2) | 1 | | | | |
| | 18 | (3,5) | 1 | | | | |
| | 19 | (2,5) | 1 | | | | |
| Frame structure type 2 | 20 | (11,1) | 1 | (11,1) | 1 | (11,1) | 1 |
| | 21 | (9,1) | 1 | (9,1) | 1 | (9,1) | 1 |
| | 22 | (7,1) | 1 | (7,1) | 1 | (7,1) | 1 |
| only | 23 | (10,1) | 1 | (10,1) | 1 | | |
| | 24 | (8,1) | 1 | (8,1) | 1 | | |
| | 25 | (6,1) | 1 | (6,1) | 1 | | |
| | 26 | (5,1) | 1 | | | | |
| | 27 | (4,1) | 1 | | | | |
| | 28 | (3,1) | 1 | | | | |
| | 29 | (2,1) | 1 | | | | |
| | 30 | (1,1) | 1 | | | | |
| | 31 | (0,1) | 1 | | | | |

TABLE 3

Resource mapping configured by CSI-RS at extended cyclic prefix subframes

| | CSI reference signal configuration | Number of CSI reference signals configured | | | | | |
|---|---|---|---|---|---|---|---|
| | | 1 or 2 | | 4 | | 8 | |
| | | (k',l') | $n_s$ mod 2 | (k',l') | $n_s$ mod 2 | (k',l') | $n_s$ mod 2 |
| Frame structure type 1 and 2 | 0 | (11,4) | 0 | (11,4) | 0 | (11,4) | 0 |
| | 1 | (9,4) | 0 | (9,4) | 0 | (9,4) | 0 |
| | 2 | (10,4) | 1 | (10,4) | 1 | (10,4) | 1 |
| | 3 | (9,4) | 1 | (9,4) | 1 | (9,4) | 1 |
| | 4 | (5,4) | 0 | (5,4) | 0 | | |
| | 5 | (3,4) | 0 | (3,4) | 0 | | |
| | 6 | (4,4) | 1 | (4,4) | 1 | | |
| | 7 | (3,4) | 1 | (3,4) | 1 | | |
| | 8 | (8,4) | 0 | | | | |
| | 9 | (6,4) | 0 | | | | |
| | 10 | (2,4) | 0 | | | | |
| | 11 | (0,4) | 0 | | | | |
| | 12 | (7,4) | 1 | | | | |
| | 13 | (6,4) | 1 | | | | |
| | 14 | (1,4) | 1 | | | | |
| | 15 | (0,4) | 1 | | | | |
| Frame structure type 2 | 16 | (11,1) | 1 | (11,1) | 1 | (11,1) | 1 |
| | 17 | (10,1) | 1 | (10,1) | 1 | (10,1) | 1 |
| | 18 | (9,1) | 1 | (9,1) | 1 | (9,1) | 1 |
| | 19 | (5,1) | 1 | (5,1) | 1 | | |
| only | 20 | (4,1) | 1 | (4,1) | 1 | | |
| | 21 | (3,1) | 1 | (3,1) | 1 | | |
| | 22 | (8,1) | 1 | | | | |
| | 23 | (7,1) | 1 | | | | |
| | 24 | (6,1) | 1 | | | | |
| | 25 | (2,1) | 1 | | | | |
| | 26 | (1,1) | 1 | | | | |
| | 27 | (0,1) | 1 | | | | |

TABLE 4

CSI-RS subframe configuration

| CSI-RS-subframe configuration $I_{CSI-RS}$ | CSI-RS period $T_{CSI-RS}$ (number of subframes) | CSI-RS subframe offset $\Delta_{CSI-RS}$ (number of subframes) |
|---|---|---|
| 0-4 | 5 | $I_{CSI-RS}$ |
| 5-14 | 10 | $I_{CSI-RS}$ − 5 |
| 15-34 | 20 | $I_{CSI-RS}$ − 15 |

TABLE 4-continued

| CSI-RS subframe configuration | | |
| --- | --- | --- |
| CSI-RS-subframe configuration $I_{CSI-RS}$ | CSI-RS period $T_{CSI-RS}$ (number of subframes) | CSI-RS subframe offset $\Delta_{CSI-RS}$ (number of subframes) |
| 35-74 | 40 | $I_{CSI-RS}$ − 35 |
| 75-154 | 80 | $I_{CSI-RS}$ − 75 |

The zero power CSI-RS notifies the terminal side of resource elements on which rate matching needs to be performed through a 16-bit bitmap sequence. The terminal side is notified of a subframe in which the zero power CSI-RS is located through the subframe offset and period, as shown in Table 4.

The object of the non-zero power CSI-RS is mainly to make the terminal side measure the CSI and feed back to the base station side. The main object of the zero power CSI-RS is to reduce the interference of data services to the CSI-RS so as to improve the accuracy of CSI measurement, and the terminal side is informed of a resource location of the zero power CSI-RS at the base station side, and the terminal side assumes that the base station does not place the PDSCH or other reference signals or channels at the resource location of the zero power CSI-RS.

The R11 is required to consider the influence of the CoMP on the standard, and especially the interference measurement resource configuration and zero power CSI-RS resource configuration are required to be considered. In the latest 68bis conference, it is discussed that a comparatively accurate interference estimation performance can be obtained by measuring the interference with the zero power CSI-RS resources, meanwhile it can be partially compatible with a terminal with R10 release, which makes it avoid a performance loss in the PDSCH punching resulted from the interference measurement resources by configuring the zero power CSI-RS. If the means of measuring the interference by the zero power CSI-RS is introduced at the stage of R11, the rate matching resources required to be identified by the terminal side need to include the following three kinds:

1. Non-zero power CSI-RS resources. It mainly refers to that the base station side sends the CSI-RS by means of 8 or 4 ports, and the terminal side can only support 4 or 2 ports at most, and rate matching is required to be performed at other port locations which cannot be identified at this point. Or the base station side sends the CSI-RS, but the terminal side uses a feedback mode 1-0, 2-0 or 3-0, a CSI-RS port is not required to be configured at this point, only the zero power CSI-RS is required to be configured.

2. Zero power CSI-RS resources, used for reducing the interference of the data services to the CSI-RS measurement.

3. Zero power CSI-RS resources, used for the terminal side measuring the interference at the corresponding resource locations.

With regard to the points 1 and 2, it is the same as the object of the zero power CSI-RS configuration of the R10, and with regard to the point 3, the newly added zero power CSI-RS is used for the interference measurement. Therefore, with regard to the R11, it is required to have a new zero power CSI-RS configuration way which can be used for the interference measurement, and the zero power CSI-RS used for the interference measurement is the Interference Measurement Resource (IMR).

With regard to the traditional R8/9/10 systems, since a Cell Specific Reference Signal (CRS) is sent by each valid downlink subframe, the terminal can perform channel measurement or interference measurement based on each subframe, and each valid downlink subframe can be one CSI reference resource, and with regard to the R11 system, both the CSI-RS and IMR are configured periodically, the computation complexity of the terminal will be caused if each valid subframe is one CSI reference resource, especially for a CoMP terminal, and since such terminal is required to compute and feed back CSI of multiple CSI Processes (one CSI Process corresponds to one Non Zero Power (NZP) CSI-RS configuration and one IMR configuration).

Since the new transmission mode is required to support the CSI feedback of multiple CSI Processes, the terminal complexity is excessively high when determining the CSI, thus excessively high costs of the terminal are caused, and this problem is more prominent to a Time Division Duplex (TDD) system.

SUMMARY OF THE INVENTION

The embodiments of the present invention provide a terminal and method for determining channel state information, which overcomes a problem that the terminal complexity is excessively high, and solves a problem that costs of the existing system are too high when using the transmission mode 10 and the TDD mode.

The embodiment of the present invention provides a method for determining channel state information, which comprises: a terminal UE receiving an aperiodic channel state information CSI request, determining a parameter X according to a capability of the terminal processing a channel state information CSI Process and/or the number of CSI processes y configured currently, and updating up to X aperiodic CSI according to the parameter X; wherein both the y and X are positive integers greater than or equal to 1, and the parameter X is: a total number of CSI processes or reports required to be updated by the terminal at the same moment in one or more aperiodic CSI requests.

The above method can be further characterized in that:
the capability of processing the CSI process comprises a maximum number P of CSI processes that can be processed by the terminal;
the terminal determining the parameter X according to the capability of the terminal processing the CSI process and/or the number of CSI processes y configured currently comprises:
when the P is greater than or equal to P0, determining a value of the parameter X according to the number of CSI processes y configured currently, wherein the P0 is 3 or 4.

The above method can be further characterized in that:
the parameter X=y.

The above method can be further characterized in that:
the capability of processing the CSI process comprises a maximum number P of CSI processes that can be processed by the terminal;
the terminal determining the parameter X according to the capability of the terminal processing the CSI process and/or the number of CSI processes y configured currently comprises:
when the P is greater than or equal to P0, determining a value of the parameter X according to the number of CSI processes y configured currently and the P; wherein the P0 is 3 or 4.

The above method can be further characterized in that:
a value of the P is one of 3 and 4; or a value of the P is only 4.

The above method can be further characterized in that:
the terminal updating up to X aperiodic CSI according to the parameter X comprises:
the terminal determining that the number of aperiodic CSI required to be updated is a minimum value Z in the X and Y, and updating Z aperiodic CSI;
wherein the Y is the number of CSI to be reported.

The above method can be further characterized in that:
the step of the terminal updating up to X aperiodic CSI according to the parameter X comprises:
performing channel measurement and/or interference measurement according to a received channel state information reference signal CSI-RS, and determining a CSI reference resource, and computing aperiodic CSI corresponding to the CSI reference resource.

The above method can be further characterized in that:
the method further comprises: the terminal reporting the updated aperiodic CSI to a network side.

The embodiment of the present invention further provides a terminal UE for determining channel state information, which comprises:
a receiving unit, configured to: receive an aperiodic CSI request;
a determination unit, configured to: determine a parameter X according to a capability of the terminal processing a CSI process and/or the number of CSI processes y configured currently; and
an updating unit, configured to: update up to X aperiodic CSI according to the parameter X;
wherein both the y and X are positive integers greater than or equal to 1, and the parameter X is: a total number of CSI processes or reports required to be updated by the terminal at the same moment in one or more aperiodic CSI requests.

The above terminal can be further characterized in that:
the capability of processing the CSI process comprises a maximum number P of CSI processes that can be processed by the terminal;
the determination unit is configured to determine the parameter X by means of:
when the P is greater than or equal to P0, determining a value of the parameter X according to the number of CSI processes y configured currently, wherein the P0 is 3 or 4.

The above terminal can be further characterized in that:
the parameter X=y.

The above terminal can be further characterized in that:
the capability of processing the CSI process comprises a maximum number P of CSI processes that can be processed by the terminal;
the determination unit is configured to determine the parameter X by means of:
when the P is greater than or equal to P0, determining a value of the parameter X according to the number of CSI processes y configured currently and the P; wherein the P0 is 3 or 4.

The above terminal can be further characterized in that:
the determination unit is configured to determine the parameter X by means of:
a value of the P is one of 3 and 4; or a value of the P is only 4.

The above terminal can be further characterized in that:
the updating unit is configured to update up to X aperiodic CSI according to the parameter X by means of:
determining that the number of aperiodic CSI required to be updated is a minimum value Z in the X and Y, and updating Z aperiodic CSI;
wherein the Y is the number of CSI to be reported.

The above terminal can be further characterized in that:
the updating unit is configured to update each aperiodic CSI required to be updated by means of:
performing channel measurement and/or interference measurement according to a received channel state information reference signal CSI-RS, and determining a CSI reference resource, and computing aperiodic CSI corresponding to the CSI reference resource.

The above terminal can be further characterized in that:
the terminal further comprises a reporting unit, configured to: report the updated aperiodic CSI to a network side.

In conclusion, with the scheme of the embodiments of the present invention, in the condition of not increasing any system complexity and signaling overhead, with regard to a transmission mode 11 or the later transmission modes, the number of aperiodic CSI required to be updated is decided in consideration of the processing capability of the UE and the number of CSI Processes configured, and a reasonable limitation on the computation quantity of data CSI is made, which guarantees that the terminal has a reasonable complexity and ensures that the terminal has reasonable costs.

PREFERRED EMBODIMENTS OF THE INVENTION

The embodiments of the present invention will be described in detail in combination with the accompanying drawings below. It should be noted that the embodiments in the present invention and the characteristics in the embodiments can be optionally combined with each other in the condition of no conflict.

Before introducing the technical scheme of the patent document, firstly the CSI reference resource is introduced;
at first, the CSI reference resource is explained from three aspects: time domain, frequency domain and transmission domain.

In the frequency domain, the CSI reference resource is defined by a group of downlink physical resource blocks, and these resource blocks correspond to a section of bandwidth related to the obtained CQI values;

in the time domain, the CSI reference resource is defined by one unique downlink subframe $n-nCQI\_ref$;

herein, with regard to a periodic CSI report, nCQI_ref is a minimum value greater than or equal to 4, and the object is that it can correspond to one valid downlink subframe.

Herein, with regard to an aperiodic CSI report, $n_{CQI\_ref}$ is a subframe as follows: the reference resource appears in a valid subframe which is the same as a subframe of a corresponding CSI request, wherein the CSI request appears in one uplink Downlink Control Information (DCI) format.

Herein, with regard to the aperiodic CSI report, $n_{CQI\_ref}$ is equal to 4 and the downlink subframe $n-n_{CQI\_ref}$ corresponds to one valid downlink subframe, and herein the downlink subframe $n-n_{CQI\_ref}$ is received after there is a subframe of a corresponding CSI request, and the CSI request appears in a Random Access Response Grant.

In the transmission domain, the CSI reference resource is defined by the PMI and RI, and the CQI is on the condition of the PMI and RI.

Method Embodiment

Figure 1:
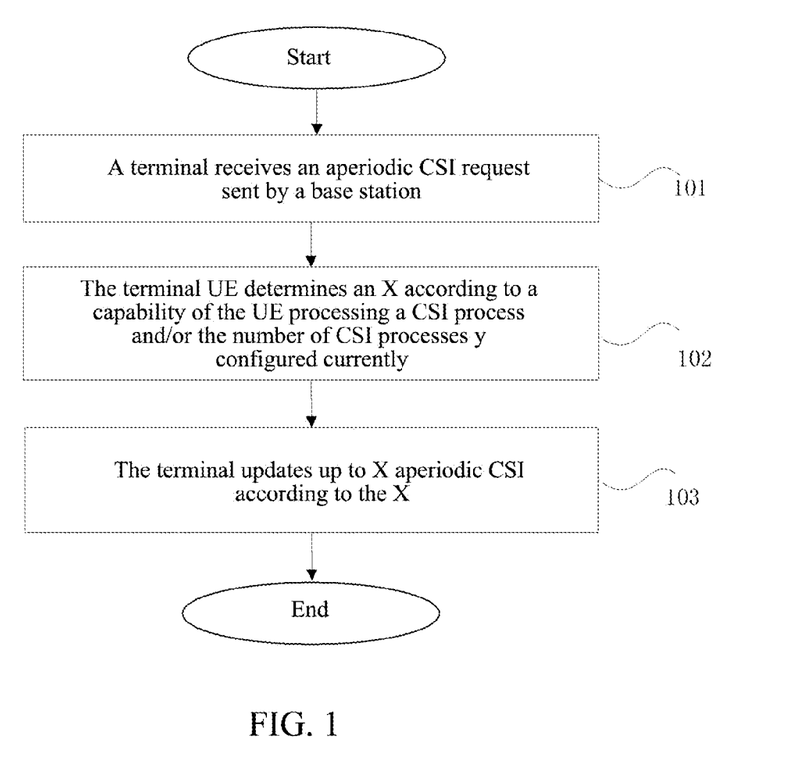
FIG. 1 is a flow chart of a method for determining channel state information in the method embodiment of the present invention.

The embodiment provides a method for determining channel state information, and as shown in FIG. 1, the following steps are included.

In step 101, a UE receives an aperiodic CSI request.

In step 102, the UE determines a parameter X according to a capability of the UE processing a channel state information CSI Process and/or the number of CSI processes y configured currently, wherein y is a positive integer greater than or equal to 1.

In step 103, up to X aperiodic CSI is updated according to the X.

The capability of processing the CSI Process includes a maximum number P of CSI Processes that can be processed by the terminal, wherein the P is a positive integer greater than or equal to 1;

wherein the parameter X is: a total number of CSI Processes or reports required to be updated by the terminal at the same moment in one or more aperiodic CSI requests.

The process of determining the X according to the P and y includes that: when the maximum number P of CSI Processes that can be processed by the terminal is greater than or equal to P0, a value of the X can be determined according to the number of CSI Processes configured currently; for example, X=y, or when the maximum number P of CSI Processes that can be processed by the terminal is greater than or equal to P0, a value of the X can be determined according to the number of CSI Processes configured currently and the maximum number P of CSI Processes that can be processed by the terminal.

Updating up to X aperiodic CSI according to the X includes: the terminal determining the number Z of aperiodic CSI required to be updated, and updating Z aperiodic CSI; wherein Z=min(X,Y), min represents selecting a minimum value in the X and Y, and the Y is the number of CSI to be reported.

The process of updating each aperiodic CSI required to be updated includes: performing channel measurement and/or interference measurement according to the received channel state information reference signal CSI-RS, and determining a CSI reference resource, and then the terminal computing a CQI value corresponding to the CSI reference resource.

Preferably, one CSI Process can correspond to one or more CSI to be reported.

Preferably, the terminal reports the updated aperiodic CSI to a network side.

How to determine the X is explained through two more specific embodiments below.

Embodiment 1

If P=3 or 4, y=2, 3 and 4, a value of the X is y;

the number of CSI to be reported is assumed to be Y, and the number of aperiodic CSI required to be updated is Z=min(X,Y), min represents selecting a minimum in the two values. The terminal updates Z aperiodic CSI.

When y is equal to 1, there is no limitation on the X.

The value of the y may be 1, 2, 3 and 4 at present; and a value of the P may be 1, 3 and 4.

In conclusion, here in the CSI computation method, the number of aperiodic CSI required to be updated is decided in full consideration of the capability of the UE and the number of CSI Processes configured. A reasonable limitation on the computation quantity of data CSI is made, which guarantees that the terminal has a reasonable complexity and ensures that the terminal has reasonable costs and is especially applicable to a time division duplex system.

Embodiment 2

If P=3, y=2 or 3, a value of the X is P;

If P=4, y=2 or 3, a value of the X is min(P,3); otherwise, when y=4, a value of the X is P;

the number of CSI to be reported is assumed to be Y, and the number of aperiodic CSI required to be updated is Z=min(X,Y), min represents selecting a minimum in the two values. The terminal updates Z aperiodic CSI.

When y is equal to 1, there is no limitation on the X.

The value of the y may be 1, 2, 3 and 4 at present; and a value of the P may be 1, 3 and 4.

Terminal Embodiment

Figure 2:
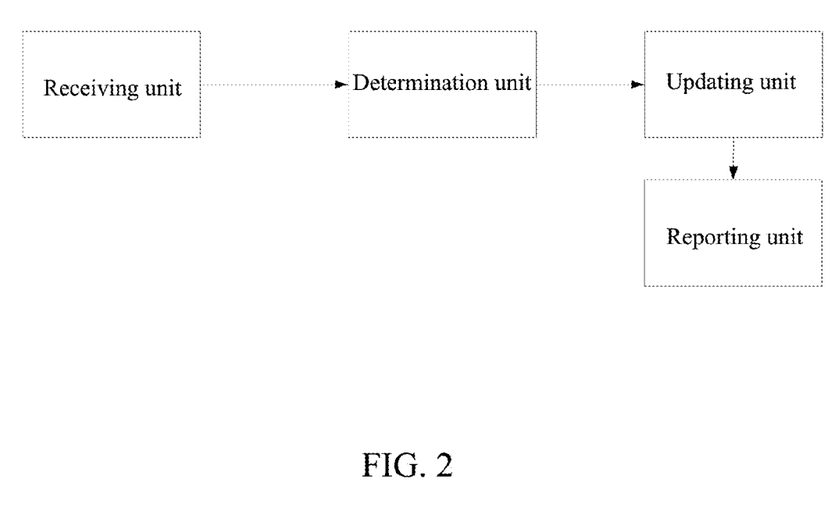
FIG. 2 is a schematic diagram of structure of a terminal in the embodiment of the present invention.

The embodiment provides a terminal for determining channel state information, as shown in FIG. 2, which includes:

a receiving unit, configured to: receive an aperiodic CSI request;

a determination unit, configured to: determine a parameter X according to a capability of the terminal processing a channel state information CSI Process and/or the number of CSI processes y configured currently;

an updating unit, configured to: update up to X aperiodic CSI according to the parameter X; and a reporting unit, configured to: report the updated aperiodic CSI to a network side.

The parameter X is: a total number of CSI processes or reports required to be updated by the terminal at the same moment in one or more aperiodic CSI requests.

The capability of processing the CSI Process includes a maximum number of CSI Processes that can be processed by the terminal;

the process of the determination unit determining the parameter X includes:

when the maximum number P of CSI Processes that can be processed by the terminal is greater than or equal to P0, determining a value of the parameter X according to the number of CSI processes y configured currently, wherein the P0 is 3 or 4.

In one embodiment, the parameter X=y.

The capability of processing the CSI Process includes a maximum number of CSI Processes that can be processed by the terminal;

the process of the determination unit determining the parameter X includes:

when the maximum number P of CSI Processes that can be processed by the terminal is greater than or equal to P0, determining a value of the parameter X according to the number of CSI processes y configured currently and the P, wherein the P0 is 3 or 4.

A value of the P is one of 3 and 4; or a value of the P is only 4.

The updating unit updating up to X aperiodic CSI according to the parameter X includes:

the updating unit determining that the number of aperiodic CSI required to be updated is a minimum value Z in the X and Y, and updating Z aperiodic CSI;

wherein the Y is the number of CSI to be reported.

The updating unit updates each aperiodic CSI required to be updated by means of:

performing channel measurement and/or interference measurement according to the received channel state information reference signal CSI-RS, and determining a CSI reference resource, and computing aperiodic CSI corresponding to the CSI reference resource.

The ordinary person skilled in the art can understand that all or part of the steps in the above method can be completed by a program instructing related hardware, and the program can be stored in a computer readable memory medium, such as a read-only memory, disk or optical disk and so on. Alternatively, all or part of the steps of the above embodiments also can be implemented by using one or more integrated circuits. Correspondingly, each module/unit in the above embodiments can be implemented in a form of hardware, and also can be implemented in a form of software function module. The patent document is not limited to any combination of hardware and software in a specific form.

The above description is only the embodiments of the present invention, which is not used to limit the patent document. The patent document can have various modifications and changes for the skilled in the art. All the modifications, equivalent substitutions, and improvements, etc. made within the spirit and principle of the patent document shall fall into the scope of the claims of the present document.

INDUSTRIAL APPLICABILITY

In the embodiments of the present invention, in the condition of not increasing any system complexity and signaling overhead, with regard to a transmission mode 11 or the later transmission modes, the number of aperiodic CSI required to be updated is decided in consideration of the processing capability of the UE and the number of CSI Processes configured, and a reasonable limitation on the computation quantity of data CSI is made, which guarantees that the terminal has a reasonable complexity and ensures that the terminal has reasonable costs.

What is claimed is:

1. A method for determining Channel State information (CSI), comprising:
a terminal receiving an aperiodic CSI request, determining a parameter X according to a capability of the terminal processing a CSI process and/or a number of configured CSI processes y at an instant of receiving the CSI request, and updating up to X aperiodic CSI according to the parameter X; wherein both y and X are positive integers greater than or equal to 1, and the parameter X is: a total number of CSI processes or reports required to be updated by the terminal in one or more aperiodic CSI requests at the same instant; wherein
the capability of the terminal processing the CSI process comprises a maximum number of CSI processes P that can be processed by the terminal; and
the terminal determining the parameter X according to the capability of the terminal processing the CSI process and/or the number of configured CSI processes y at the instant of receiving the CSI request comprises:
when the P is greater than or equal to P0, determining a value of the parameter X according to the number of configured CSI processes y at the instant of receiving the CSI request, wherein the P0 is 3 or 4.

2. The method according to claim 1, wherein: the parameter X=y.

3. The method according to claim 1, wherein:
the capability of processing the CSI process comprises a maximum number P of CSI processes that can be processed by the terminal;
the terminal determining the parameter X according to the capability of the terminal processing the CSI process and/or the number of configured CSI processes y at the instant of receiving the CSI request comprises:
when the P is greater than or equal to P0, determining a value of the parameter X according to the number of configured CSI processes y at the instant of receiving the CSI request and the P; and wherein the P0 is 3 or 4.

4. The method according to claim 3, wherein:
the terminal updating up to X aperiodic CSI according to the parameter X comprises:
the terminal determining that a number of aperiodic CSI required to be updated is Z which is the minimum value of the X and Y, and updating Z aperiodic CSI; and wherein the Y is the number of CSI to be reported.

5. The method according to claim 1, wherein: a value of the P is selected from one of the values 3 and 4; or a value of the P is selected from the value of 4 only.

6. The method according to claim 1, wherein:
the terminal updating up to X aperiodic CSI according to the parameter X comprises:
the terminal determining that a number of aperiodic CSI required to be updated is Z which is the minimum value of the X and a Y, and updating Z aperiodic CSI; and wherein the Y is the number of CSI to be reported.

7. The method according to claim 1, wherein:
the step of the terminal updating up to X aperiodic CSI according to the parameter X comprises:
performing channel measurement and/or interference measurement according to a received channel state information reference signal CSI-RS, and determining a CSI reference resource, and computing aperiodic CSI corresponding to the CSI reference resource.

8. The method according to claim 1, further comprising:
the terminal reporting the updated aperiodic CSI to a network side.

9. The method according to claim 1, wherein:
the terminal updating up to X aperiodic CSI according to the parameter X comprises:
the terminal determining that a number of aperiodic CSI required to be updated is Z which is the minimum value of the X and Y, and updating Z aperiodic CSI; and wherein the Y is the number of CSI to be reported.

10. A terminal for determining Channel State Information (CSI), comprising hardware performing instructions stored in a non-transitory computer readable medium which executes steps in following units:
a receiving unit, configured to: receive an aperiodic CSI request;
a determination unit, configured to: determine a parameter X according to a capability of the terminal processing a CSI process and/or a number of configured CSI processes y at an instant of receiving the CSI request; and
an updating unit, configured to: update up to X aperiodic CSI according to the parameter X;
wherein both the y and X are positive integers greater than or equal to 1, and the parameter X is: a total number of CSI processes or reports required to be updated by the terminal at the same moment in one or more aperiodic CSI requests; wherein the capability of the terminal processing the CSI process comprises a maximum number P of CSI processes that can be processed by the terminal; and the determination unit is configured to determine the parameter X by means of:

when the P is greater than or equal to P0, determining a value of the parameter X according to the number of configured CSI processes y at the instant of receiving the CSI request, wherein the P0 is 3 or 4.

11. The terminal according to claim 10, wherein the parameter X=y.

12. The terminal according to claim 10, wherein:

the capability of processing the CSI process comprises a maximum number P of CSI processes that can be processed by the terminal;

the determination unit is configured to determine the parameter X by means of:

when the P is greater than or equal to P0, determining a value of the parameter X according to the number of configured CSI processes y at the instant of receiving the CSI request and the P; and wherein the P0 is 3 or 4.

13. The terminal according to claim 12, wherein:

the updating unit is configured to update up to X aperiodic CSI according to the parameter X by means of:

determining that a number of aperiodic CSI required to be updated is a minimum value Z in the X and Y, and updating Z aperiodic CSI; and wherein, the Y is the number of CSI to be reported.

14. The terminal according to claim 10, wherein: the determination unit is configured to determine the parameter X by means of:

a value of the P is one of 3 and 4; or a value of the P is only 4.

15. The terminal according to claim 10, wherein:

the updating unit is configured to update up to X aperiodic CSI according to the parameter X by means of:

determining that a number of aperiodic CSI required to be updated is a minimum value Z in the X and Y, and updating Z aperiodic CSI; and wherein, the Y is the number of CSI to be reported.

16. The terminal according to claim 10, wherein:

the updating unit is configured to update each aperiodic CSI required to be updated by means of:

performing channel measurement and/or interference measurement according to a received channel state information reference signal CSI-RS, and determining a CSI reference resource, and computing aperiodic CSI corresponding to the CSI reference resource.

17. The terminal according to claim 10, wherein the hardware further performing instructions stored in a non-transitory computer readable medium which executes steps in a following unit:

a reporting unit, configured to: report the updated aperiodic CSI to a network side.

18. The terminal according to claim 10, wherein:

the updating unit is configured to update up to X aperiodic CSI according to the parameter X by means of:

determining that a number of aperiodic CSI required to be updated is a minimum value Z in the X and Y, and updating Z aperiodic CSI; and wherein, the Y is the number of CSI to be reported.

* * * * *